United States Patent
Maartens et al.

(10) Patent No.: US 12,159,137 B2
(45) Date of Patent: *Dec. 3, 2024

(54) INTERACTIVE DOCUMENTATION PAGES FOR SOFTWARE PRODUCTS AND FEATURES

(71) Applicant: K2 Software, Inc., Bellevue, WA (US)

(72) Inventors: Neil Maartens, Chicago, IL (US); Leesyl Gibson, Cape Town (ZA)

(73) Assignee: K2 Software, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,056

(22) Filed: Jul. 21, 2023

(65) Prior Publication Data
US 2023/0359460 A1 Nov. 9, 2023

Related U.S. Application Data

(63) Continuation of application No. 16/857,933, filed on Apr. 24, 2020, now Pat. No. 11,748,096.

(51) Int. Cl.
*G06F 8/73* (2018.01)
*G06F 16/9535* (2019.01)
*G06F 16/9538* (2019.01)
*G06F 16/958* (2019.01)
*G06F 40/106* (2020.01)

(52) U.S. Cl.
CPC ............ *G06F 8/73* (2013.01); *G06F 16/9535* (2019.01); *G06F 16/9538* (2019.01); *G06F 16/986* (2019.01); *G06F 40/106* (2020.01)

(58) Field of Classification Search
None
See application file for complete search history.

(56) References Cited

U.S. PATENT DOCUMENTS 7,058,944 B1 * 6/2006 Sponheim ............ G06F 16/9558 718/100
8,694,964 B1 * 4/2014 Picard ...................... G06F 8/73 715/255

(Continued)

FOREIGN PATENT DOCUMENTS

WO 2008137998 11/2008

OTHER PUBLICATIONS

Microsoft identity platform and the OAuth 2.0 device authorization grant flow; OAuth 2.0 device code flow-Microsoft dentity platform | Microsoft Docs; Nov. 19, 2019 (6 pages).

(Continued)

*Primary Examiner* — Howard Cortes
(74) *Attorney, Agent, or Firm* — Perkins Coie LLP (57) ABSTRACT

Methods and systems for providing improved and interactive product documentations are provided. In one embodiment, a method is provided that includes providing a documentation page to a computing device. The documentation page may include an identifier of a data environment associated with the documentation page. A request may be received to display the data environment and data associated with the data environment may be retrieved from a database associated with the computing device. The data environment may be created based on the retrieved data and provided to the computing device for display.

20 Claims, 7 Drawing Sheets

(56) References Cited

U.S. PATENT DOCUMENTS

| | | | |
|---|---|---|---|
| 9,959,198 B1* | 5/2018 | Jha | G06F 11/3684 |
| 10,733,000 B1* | 8/2020 | Singh | G06F 9/453 |
| 2010/0146483 A1* | 6/2010 | Komarov | G06F 8/73 |
| | | | 717/120 |
| 2011/0161990 A1* | 6/2011 | Smith | H04L 67/02 |
| | | | 719/328 |
| 2012/0102458 A1* | 4/2012 | Meijer | G06F 8/73 |
| | | | 717/123 |
| 2012/0204102 A1* | 8/2012 | Gwin | G06F 40/186 |
| | | | 715/253 |
| 2012/0278691 A1* | 11/2012 | Heiney | G06F 40/10 |
| | | | 715/202 |
| 2013/0074036 A1* | 3/2013 | Brandt | G06F 8/33 |
| | | | 717/113 |
| 2013/0085871 A1* | 4/2013 | Goss | G06Q 30/02 |
| | | | 705/14.73 |
| 2013/0091491 A1* | 4/2013 | Koutyrine | G06F 8/73 |
| | | | 717/123 |
| 2013/0166414 A1* | 6/2013 | Razvi | G06Q 30/06 |
| | | | 705/26.61 |
| 2016/0011868 A1* | 1/2016 | Frenkiel | G06F 8/30 |
| | | | 717/123 |
| 2017/0168856 A1* | 6/2017 | Bhargava | G06F 9/453 |
| 2019/0096280 A1* | 3/2019 | Saunders | G06F 11/3013 |
| 2020/0226615 A1* | 7/2020 | Gaur | G06F 9/541 |
| 2021/0049085 A1* | 2/2021 | Zhang | G06F 16/9577 |
| 2021/0326430 A1* | 10/2021 | Coimbra | G06F 16/9535 |
| 2021/0334094 A1* | 10/2021 | Maartens | G06F 16/9538 |

OTHER PUBLICATIONS

Tryit Editor v3 .6; https://w3schools.corn/html/tryit.asp?filename·tryhtml_default; retrieved Mar. 31, 2020; 1 page.

\* cited by examiner

Scenario ~ 204

For your Human Resources application you need to select an employee's name, surname, and department. This information is already in a SmartObject. Using an item view with drop down list controls you configure a rule to load the surname and department values for the name selected in the Name drop down list.

Steps ~ 222

First, create a SmartObject to store your employee name, surname, and department information. Generate an editable list view of the SmartObject and use the view to add data to the SmartObject. Create an item view of the SmartObject and change the text box controls to drop down lists. Add a rule to load the associated surname and department data when a name is selected.

Setup Steps ~ 224

The following steps set up the scenario from start to finish. If you want to skip the setup steps and view the topic step, go to Design a view that loads associated data when a name is selected.

1. In K2 Designer create a SmartBox SmartObject named Employees with Name, Surname, and Department properties. If you are not familiar with creating a SmartBox SmartObject, see How to: Create A SmartBox SmartObject.
   › Show me how...

2. Generate an editable list view of the Employees SmartObject. If you are not familiar with creating views, see How To: Create an Item View and a List View.
   › Show me how...

3. Add information to the Employees SmartObject using the Employees Editable List.
   › Show me how...

INTERACTIVE DOCUMENTATION PAGES FOR SOFTWARE PRODUCTS AND FEATURES

CROSS-REFERENCE TO RELATED APPLICATION(S)

This application claims benefit to U.S. Non-Provisional application Ser. No. 16/857,933 filed on Apr. 24, 2020, and titled "Interactive Documentation Pages for Software Products and Features," the contents all of which are incorporated by reference herein as though set forth in their entirety and to which priority and benefit are claimed.

BACKGROUND

Software products and features may have one or more associated documentation pages. The documentation pages may explain the functions performed by the products and features and may also explain how to configure or initialize the products or features. Documentation pages may be included as a part of the software product or feature itself (e.g., within a documentation document or file associated with the software product or feature) or may be accessible via a documentation portal.

SUMMARY

The present disclosure presents new and innovative systems and methods for generating and displaying documentation pages. In a first aspect, a method is provided that includes providing, to a computing device, a documentation page that includes an identifier of a data environment associated with the documentation page. A request to display the data environment may be received from the computing device and data associated with the data environment may be retrieved from a database associated with the computing device. The data environment may be created based on the data associated with the data environment and may be provided to the computing device for display.

In a second aspect according to the first aspect, the method further includes receiving, at the database and from the computing device, a query for the data environment and performing the query on the data associated with the data environment. A result of the query may be provided to the computing device for display within the data environment.

In a third aspect according to the first aspect, the query changes at least a portion of the data associated with the data environment.

In a fourth aspect according to any of the first through third aspects, the method further includes receiving, from the computing device, a request to add the data environment to a computing environment associated with the database and adding the data environment to the computing environment.

In a fifth aspect according to any of the first through fourth aspects, the documentation page is a Hypertext Markup Language (HTML) page displaying information regarding a type of environment.

In a sixth aspect according to the fifth aspect, the data environment is an implementation of the type of environment for which the documentation page provides information.

In a seventh aspect according to any of the fifth and sixth aspects, the data environment is displayed in an iframe of the HTML page.

In an eighth aspect according to any of the first through seventh aspects, the method further includes, prior to providing the documentation page, receiving, from a computing device, a request for a documentation page, the request for the documentation page including a user ID.

In a ninth aspect according to the eighth aspect, the database is identified based on the user ID.

In a tenth aspect according to any of the first through ninth aspect, creating the environment further includes combining the data with a form associated with the data environment.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF THE ILLUSTRATIVE EMBODIMENTS

In certain instances, the documentation provided for software products and features may include one or more context-dependent aspects. For example, documentation pages may display one or more related links for similar or prerequisite components of software. As a specific example, a database query to identify related items within a database may require that a database first be created and that relational links be established within the database. Therefore, related links for a documentation page explaining the database query may include links to documentation pages for creating a database and for creating relational links within the database. However, these systems are typically static, with related links determined for each documentation page and not varying for users. In particular, the documentation pages may not vary to take into account the data or installation that a user currently has in place.

Similarly, related links fail to provide a user with the opportunity to test a software product or feature before deploying the product or feature in their own environment. In certain systems, customers may be able to test out certain code before deploying. For example, although not tied to a particular documentation page, W3Schools® includes interactive pages for various programming languages, including hypertext markup language (HTML). In the interactive pages, changes to source code displayed on the page also updates an output displayed on the page so that code can be tested in real time. However, these systems are tied to instructional settings where individuals are learning to code and not to documentation pages for particular software products or features. Also, these pages typically execute the code in a local manner based solely on the code provided within the interactive page. Therefore, such interactive pages are typically not capable of executing on data stored within a computing environment or database associated with the user. In certain instances, software product documentation pages may provide a user with a link to a user's environment. For example, in its documentation for integrating with Postman® services, Microsoft® includes a link to "Run in Postman." This link opens a user's Postman deployment and allows the user to enter code from a documentation page into their Postman deployment for execution. Notably, the Postman environment opens in a different page and requires the user to manually copy and execute the code within their own environment. Such systems are inconvenient, as a user has to separately access and manipulate their environment to test the product or feature. Also, both of the above examples require users to enter and manipulate code, which limits the ability of non-technical users to test and try out products or features mentioned in documentation pages. Further, since these techniques are limited to code-based implementations, similar documentation pages for products or features that do not rely on code manipulation may not be possible.

Therefore, there exists a need for context-dependent documentation pages that enable users to try out related products or features without having to manipulate code. One solution to this problem is to generate dynamic documentation pages that are of displaying interactive data environments. In particular, instructions to display the documentation pages may identify data environments associated with the documentation pages (e.g., related to features for which documentation is provided). While displaying a documentation page, a computing device may request the data environment for display. The data environment may be created to include data associated with a user of the computing device. In particular, the data environment may be created to include data within a database associated with the user. Furthermore, the data environment may include one or more interactive forms or fields and interacting with the forms and/or fields may cause the data environment to generate a query or generating a new data record, thereby updating the data displayed within the data environment. In this way, the documentation pages may be combined with interactive demonstrations of the features for which instructions are sought, allowing the user to test the feature using data from within their own database.

Figure 1:
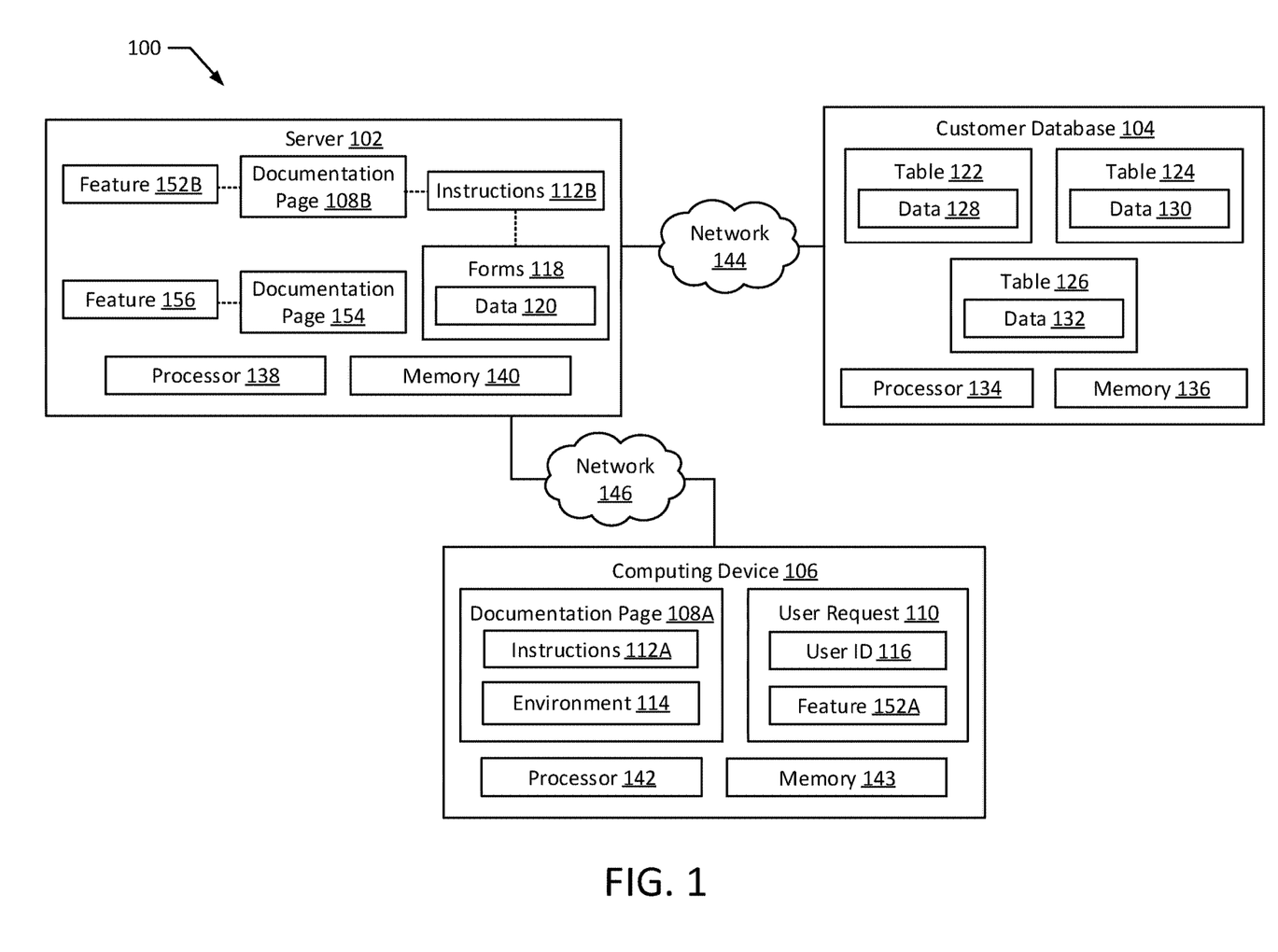
FIG. 1 illustrates a system for generating and displaying documentation pages according to an exemplary embodiment of the present disclosure.

FIG. 1 illustrates a system 100 for generating and displaying documentation pages according to an exemplary embodiment of the present disclosure. The system 100 may be configured to generate and display documentation pages for users of a particular software product that include one or more interactive forms updated based on data associated with the user. The system 100 includes a server 102, a customer database 104, and a computing device 106. The computing device 106 may be configured to generate and transmit user requests 110 to the server 102 to request documentation for particular software products or features. For example, the computing device 106 may generate a user request 110 that includes an identification of a feature 152A for which documentation is requested. The user request 110 may also include a user ID 116. The user ID 116 may identify a user of the computing device 106. For example, the server 102 and/or the customer database 104 may be associated with a particular software product (e.g., a software product providing data environments). The computing device 106 may be associated with a user of the software product. Accordingly, the user ID 116 may identify the user.

The server 102 stores documentation pages 108B, 154 that are associated with different features 152B, 156. For example, as explained above, the server 102 and the customer database 104 may be associated with a software product, and the features 152B, 156 may be features of the software product. The documentation pages 108B, 154 may display instructions and information regarding the features 152B, 156. For example, the documentation pages 108B, 154 may display instructions for setting up, implementing, configuring, and/or terminating the features 152B, 156. The documentation pages 108B may also include instructions 112B. The instructions 112B may be configured to display the documentation pages 108B, 154 (e.g., the information contained within the documentation pages 108B, 154) when executed by a computing device, such as the computing device 106. The instructions 112B may include instructions in one or more web-based languages, such as HTML, cascading style sheets (CSS), JavaScript, and the like. In certain implementations, the instructions 112B may include one or more associated forms 118. The forms 118, when combined with data 120, may enable dynamic display and/or updating of one or more aspects of the features 152B, 156.

The server 102 may receive user request 110 and may identify a documentation page associated with the feature 152A. For example, upon receiving the user request 110, the server 102 may determine that the feature 152A included within the user request 110 corresponds to the feature 152B associated with the documentation page 108B. In certain instances, the user request 110 may be a universal resource locator (URL) request in the computing device 106. For example, a user of the computing device 106 may click on a URL that causes the computing device 106 to request documentation for the feature 152A. In such instances, the server 102 may identify and transmit the instructions 112B associated with the URL requests to the computing device 106.

The computing device 106 may then receive the instructions 112A. The computing device 106 may execute the instructions 112A (e.g., in a web browser) to display the documentation page 108A (e.g., a copy of the documentation page 108B). The instructions 112A may identify an environment 114 (e.g., a data environment) associated with the documentation page 108A. For example, executing the instructions 112A may cause the computing device 106 to request, from the server 102, an environment 114. In particular, the environment 114 may be included within a portion of the document page 108A. For example, where the instructions 112A include HTML instructions, the environment 114 may be included within an iframe of the webpage displayed as a result of executing instructions 112A. Additionally or alternatively, the environment 114 may be included with embed and/or object tags within the HTML instructions.

The environment 114 may be generated based on one or more forms 118 associated with the feature 152B within the server 102. For example, the environment 114 may be generated to include one or more interactive forms 118. In particular, the forms 118 may be generated to include data 120 associated with the user ID 116 included within the user request 110. For example, when executing the instructions 112A to display the environment 114, the computing device 106 may request, from the server 102, information to display within the environment 114B. In particular, the server 102 may identify forms 118 to display within the environment 114. The forms 118 may be identified as associated with one or more of the environment 114, the instructions 112B, and/or the feature 152B within the server 102. In further instances, the instructions 112A may cause the computing device 106 to request particular forms 118. Prior to transmitting the forms 118 to the computing device 106, the server 102 may update the forms 118 with data 120 associated with the user ID 116. In particular, the server 102 may identify a customer database 104 associated with the user ID 116.

The customer data base 104 may store data 128, 130, 132 within multiple tables 122, 124, 126. The customer database 104 may be implemented as one or more types of databases, such as relational databases, operational databases, and the like. The data 128, 130, 132 stored may include information related to business operations, such as customer information, order information, personnel information, and/or inventory information. In certain instances, the customer database 104 may also include relational objects, such as SmartObjects from K2, that define relationships and/or associations between data 128, 130, 132 within the customer database 104. Additionally or alternatively, the customer database 104 may be implemented as more than one database, such as more than one database of the same type or of different types.

The server 102 may identify the customer database 104 based on the user ID 116. For example, the user ID 116 may be associated with a customer (e.g., a particular customer entity) that is associated with one or more databases and the server 102 may identify the customer database 104 as associated with the customer. In certain implementations, rather than receiving the user ID 116 with the request, the server 102 may identify a user ID associated with the computing device based on a user account that the computing device 106 is logged into (e.g., a user account associated with an IP address of the computing device 106, a cookie or other stored indicator of a user account associated with the computing device 106). The server 102 may then identify data 120 to include within the forms 118. For example, the form 118 may specify particular types of data to include (e.g., names, order numbers, inventory counts, prices, part numbers, responsible sales agents). The server 102 may then be configured to identify the data for inclusion within the forms 118. For example, the forms 118 may specify the name of a particular table 122, 124, 126 from which the data 120 can be extracted. In certain instances, the forms 118 may include data 120 that originates from more than one table 122, 124, 126. For example, the form 118 may include inventory data from table 122 and outstanding order data from table 124. The server 102 may then retrieve the data 120 for inclusion within the forms 118. In certain implementations, the forms 118 may be assembled within the server 102 before transmission to the computing device 106. For example, the server 102 may retrieve the data 120, assemble the forms 118, and transmit the assembled forms 118 to the computing device 106 for display and interaction by the user. In additional implementations, the forms 118 may be transmitted to the computing device 106 separately from the data. For example, the server 102 may initially transmit the forms 118 before subsequently transmitting the data 120 (e.g., after retrieving the data 120). In still further implementations, the environment 114 may additionally include the forms 118, so the server 102 may instead retrieve the data 120 and transmit the data to the computing device. Additionally or alternatively, where the environment 114 includes the forms 118, or after receiving the forms 118 from the server 102, the computing device 106 may retrieve the data 120. For example, the computing device 106 may be communicably coupled with the computing device 106 (e.g., using a user account associated with the computing device 106) and the computing device 106 may retrieve the data 120 using techniques similar to those discussed above with the server 102.

After receiving the forms 118 and/or the data 120, the computing device 106 may display the forms 118 including the data 120. For example, the forms 118 may be displayed within the environment 114 (e.g., an iframe) of the document page 108A (e.g., as a webpage displayed on the computing device 106). Depending on the configuration of the forms 118, all or part of the data 120 may be displayed within the forms 118. For example, the forms 118 may be configured to initially display all, none, or a subset of the data 120. Subsequent interactions (e.g., by a user) may manipulate one or more fields of the forms 118, which may cause a different portion of the data 120 to display. For example, the forms 118 may initially display all of the data 120, and a user may manipulate one or more fields of a form to filter the displayed data to only include a subset of the data 120. In certain instances, and as explained further below, user interactions with the forms 118 may change the data 120 associated with the forms.

Notably, in certain implementations, the documentation page 108A may be implemented as a single webpage combining guidance information (e.g., instructions displayed as text, audio, images, and/or video) with the environment 114 containing the forms 118. Accordingly, a user may be able to interact with the forms 118 within the environment 114 while simultaneously reviewing the guidance information displayed on the documentation page 108A. Furthermore, because the data 120 displayed within the forms 118 is retrieved from a customer database 104 associated with a user of the computing device 106, the user is able to test and interact with the feature 152A using actual data. Such implementations may allow users to better test and ascertain the functions and/or value of features 152A and may further understanding of the guidance information.

It should be noted that, in certain implementations, the server 102 may be implemented as more than one server. For example, a first server may be responsible for storing the documentation pages 108B, 154 and responding to user requests 110. A second server may be responsible for receiving requests for forms 118 and/or identifying data 120 stored within the customer database 104. As a specific example, where the user request 110 is received as a URL request, the first server may be configured to respond to URL requests with associated documentation pages 108B, 154. In certain instances, the request for the forms 118 and/or data 120 may similarly be received as a URL request, and the second server may configured to respond to URL request with the forms 118 and/or the data 120.

The server 102, the customer database 104, and the computing device 106 include processors 134, 138, 142 and memories 136, 140, 143. The processors 134, 138, 142 and the memories 136, 140, 143 may implement one or more aspects of the server 102, the customer database 104, and the computing device 106. For example, the memories 136, 140, 143 may store instructions which, when executed by the processors 134, 138, 142, may cause the processors 134, 138, 142 to perform one or more operational features of the server 102, the customer database 104, and/or the computing device 106. The processors 134, 138, 142 may be implemented as one or more central processing unit (CPUs), field programmable gate arrays (FPGAs), and/or graphics processing units (GPUs) configured to execute instructions stored on the memories 136, 140, 143.

Additionally, the server 102 and the computing device 106 communicate via network 146 and the server 102 and the customer database 104 communicate via network 144. Although not depicted, in certain implementations, the computing device 106 and the customer database 104 may similarly communicate via a network (e.g., the network 146 and/or a separate network). The server 102, the customer database 104, and the computing device 106 may connect to the networks 144, 146 using one or more network interfaces, such as wired network interfaces (e.g., Ethernet interfaces) and/or wireless network interfaces (e.g., Wi-Fi, Bluetooth, cellular data interfaces). In certain instances, the networks 144, 146 may be implemented as a local network (e.g., a local area networks) and/or a global network (e.g., the Internet). In still further instances, the network 144 may be appointed as a different type of network than the network 146. For example, the network 144 may be implemented as a local network and the network 146 may be implemented as a global network.

FIGS. 2A-2D illustrate documentation pages 200, 220, 230, 240 according to exemplary embodiments of the present disclosure. The documentation pages 200, 220, 230, 240 may be exemplary implementations of documentation pages 108A-B, 156 stored by the server 102 and/or displayed by the computing device 106. The documentation page 200 includes a title 202, a section 204, and guidance information 206, 208. As described in FIG. 2A, the documentation page 200 may include instructions for displaying SmartObjects related to one another within a view (e.g., a view of a database associated with the user). The instructions may include the guidance information 206, 208. Additionally, the documentation page 200 includes an example image 210. The example image 210 depicts an example of a database configured to display related SmartObjects. In certain instances, the example 210 may be animated (e.g., a graphical image format (GIF) animated image) and/or may additionally or alternatively include audio and/or video. However, the example image 210 may not be interactive and accordingly may only display the results of following the instructions displayed on the documentation page 200. The documentation page 200 additionally includes a data environment 212. The data environment 212 includes a title 214 indicating the data environment 212 is generated to demonstrate displaying related data using SmartObjects. The data environment 212 may be an exemplary implementation of the environment 114. Accordingly, the data environment 212 may be generated based on data associated with the user, such as a user requesting the documentation page 200. The data environment 212 further includes an interactive field 216, discussed further below.

Figure 2A:
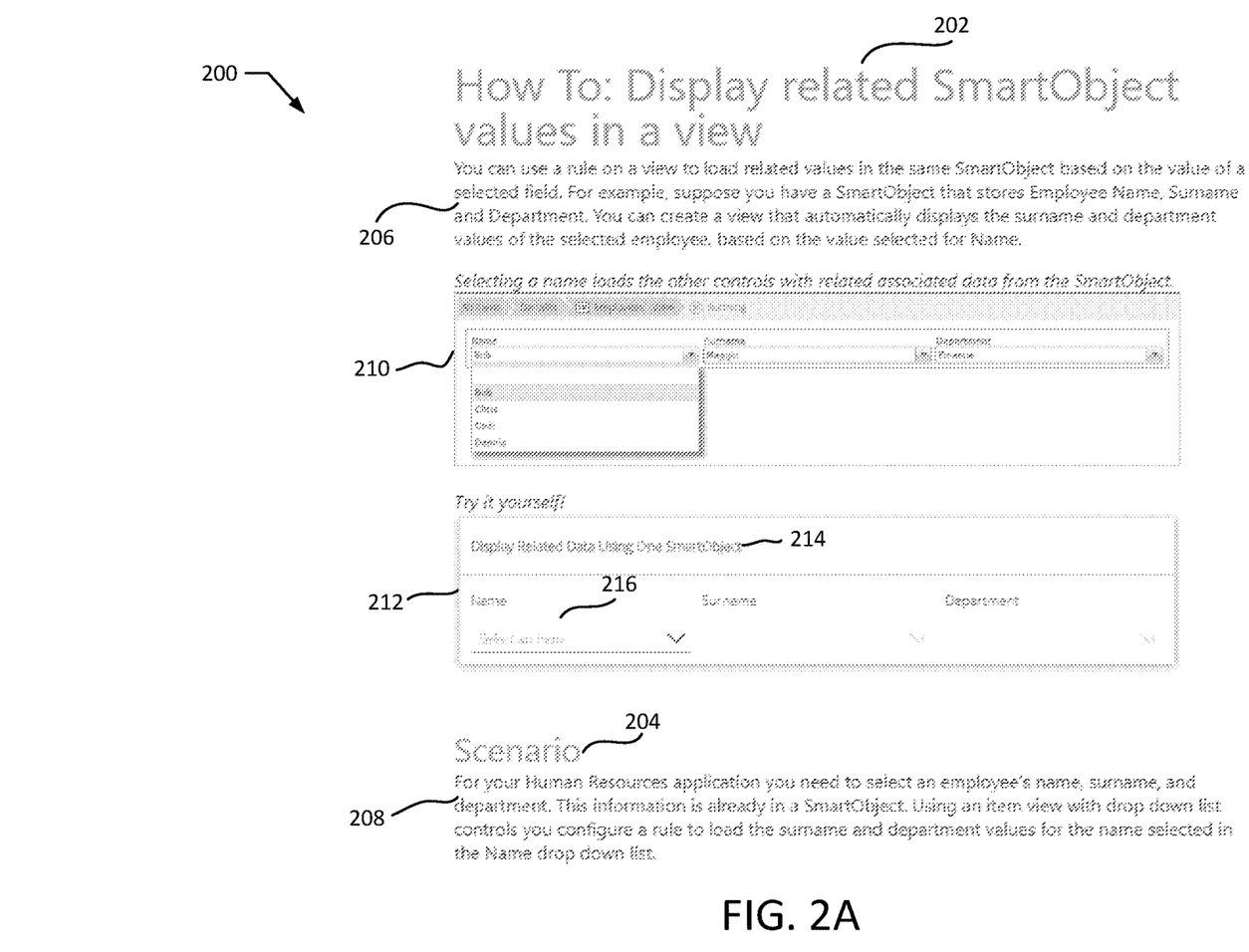
FIGS. 2A-2D illustrate documentation pages according to exemplary embodiments of the present disclosure.
Figure 2B:
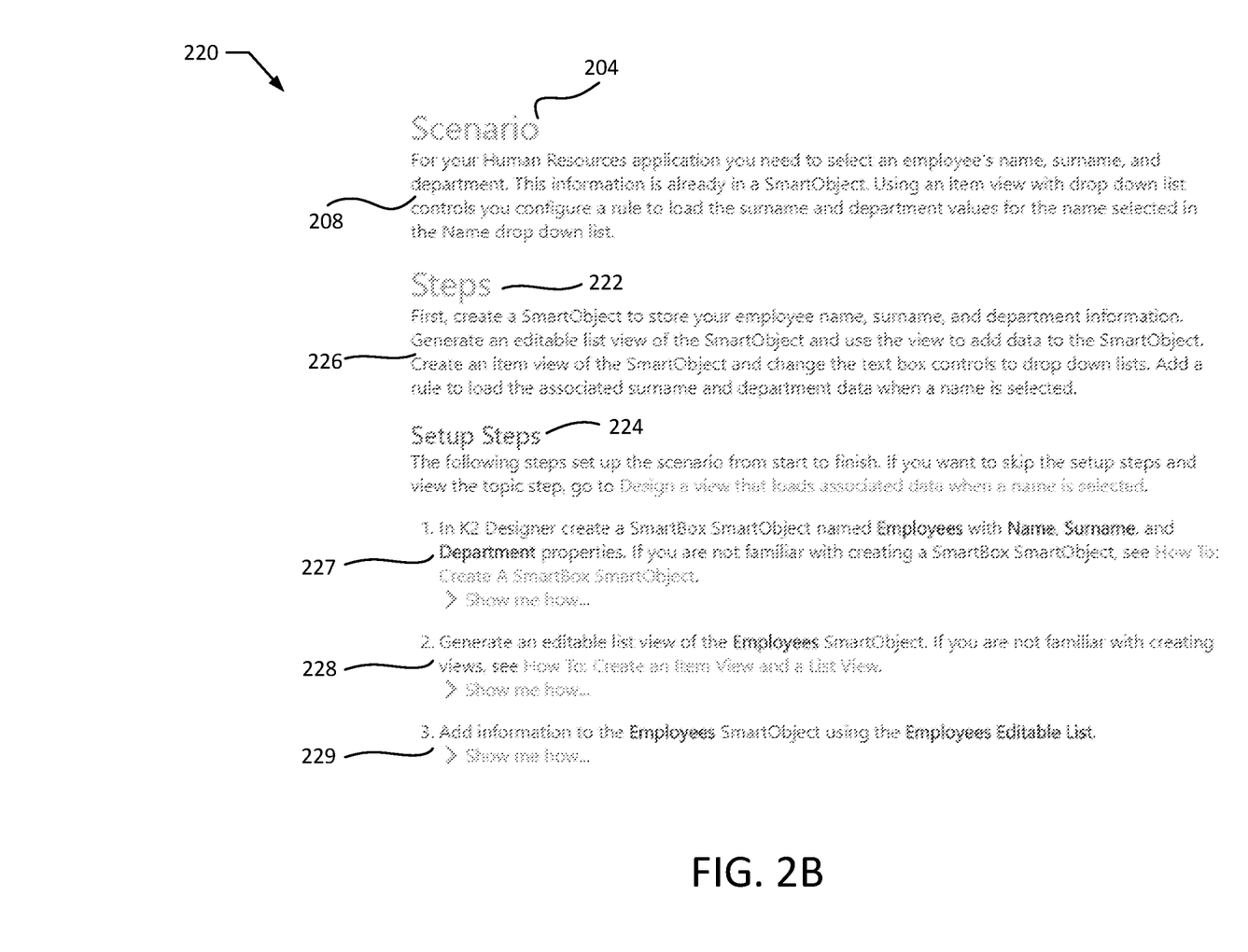

The documentation page 220 may be related to the documentation page 200. In particular, the documentation page 220 may be a part of the documentation page 200 (e.g., may be displayed as a lower portion of the documentation page 200). In particular, the documentation page 220 includes the section 204 and the guidance information 208. Documentation. 220 further includes sections 222, 224, guidance information 226, and instructions 227-229. Guidance information 226 and instructions 227-229 may provide additional guidance regarding the corresponding feature of the documentation pages 200, 220 (e.g., displaying related smart objects). In particular, the guidance information 208, 226 displayed on the document page 220 may provide general guidance for implementing and/or using the associated feature, the instructions 227-229 may provide specific instructions on what a user should do to implement the feature within their own database.

Figure 2C:
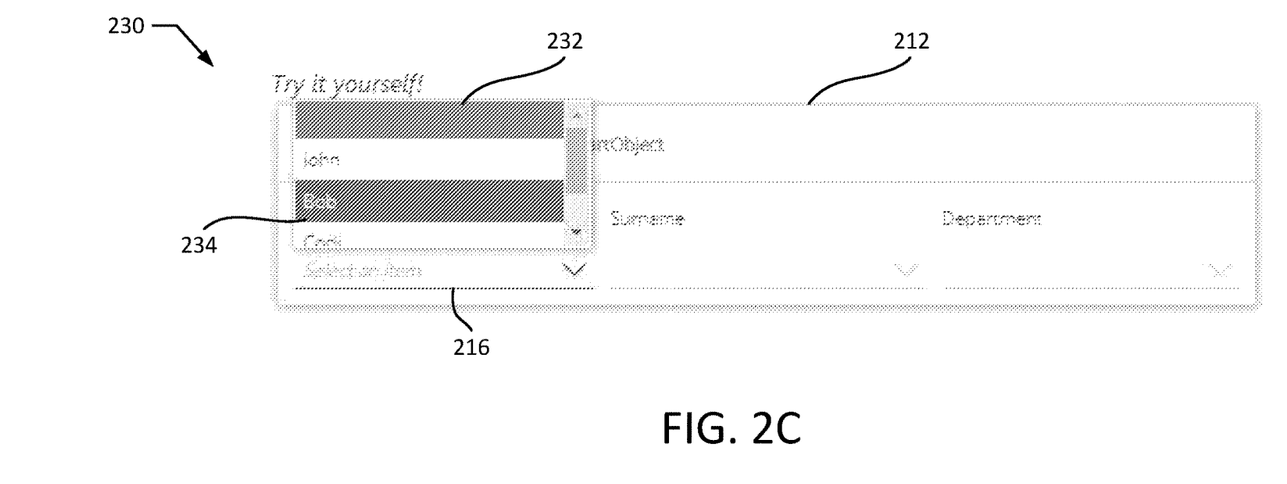
Figure 2D:
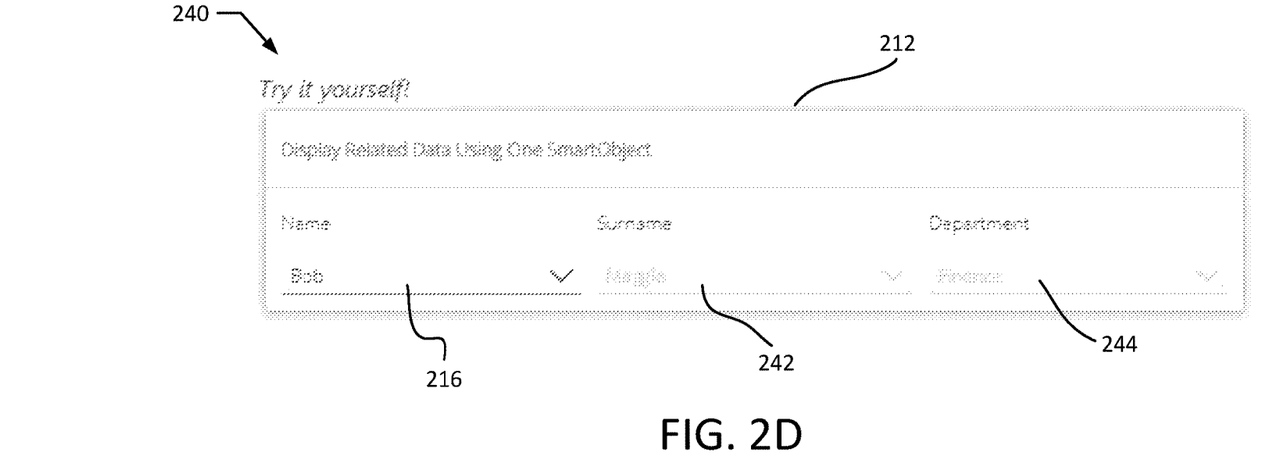

Turning to FIGS. 2C-D, the documentation pages 230, 240 depict exemplary implementations of the data environment 212. In the documentation page 230, the interactive field 216 of the data environment 212 has been selected. Selecting an interactive field 216 may cause a selection panel 232 to be displayed that includes data of a particular category. For example, the interactive field 216 is associated with name data and selecting the interactive field 216 may cause the selection panel 232 to be displayed including available names (e.g., names within a table or other subdivision of a customer database). Because the field 216 is interactive, a user may be able to select a name within the selection panel 232. For example, as depicted, a user may select the entry 234 corresponding to the name "Bob." Upon selecting the entry 234, the documentation page 240 may be displayed. In the documentation page 240, the data environment 212 includes both the interactive field 216 displaying the previously-selected entry (e.g., "Bob") along with related information in the fields 242, 244. In particular, the field 242 includes a surname of the selected name, and the field 244 depicts a department associated with the selected name (e.g., a department in which an individual associated with the selected name is employed). As explained previously, the data environment 212 may be generated to include data retrieved from a customer database associated with a user. Accordingly, the data displayed in the fields 216, 242, 244 may be updated based on the data retrieved from the customer database.

Figure 3:
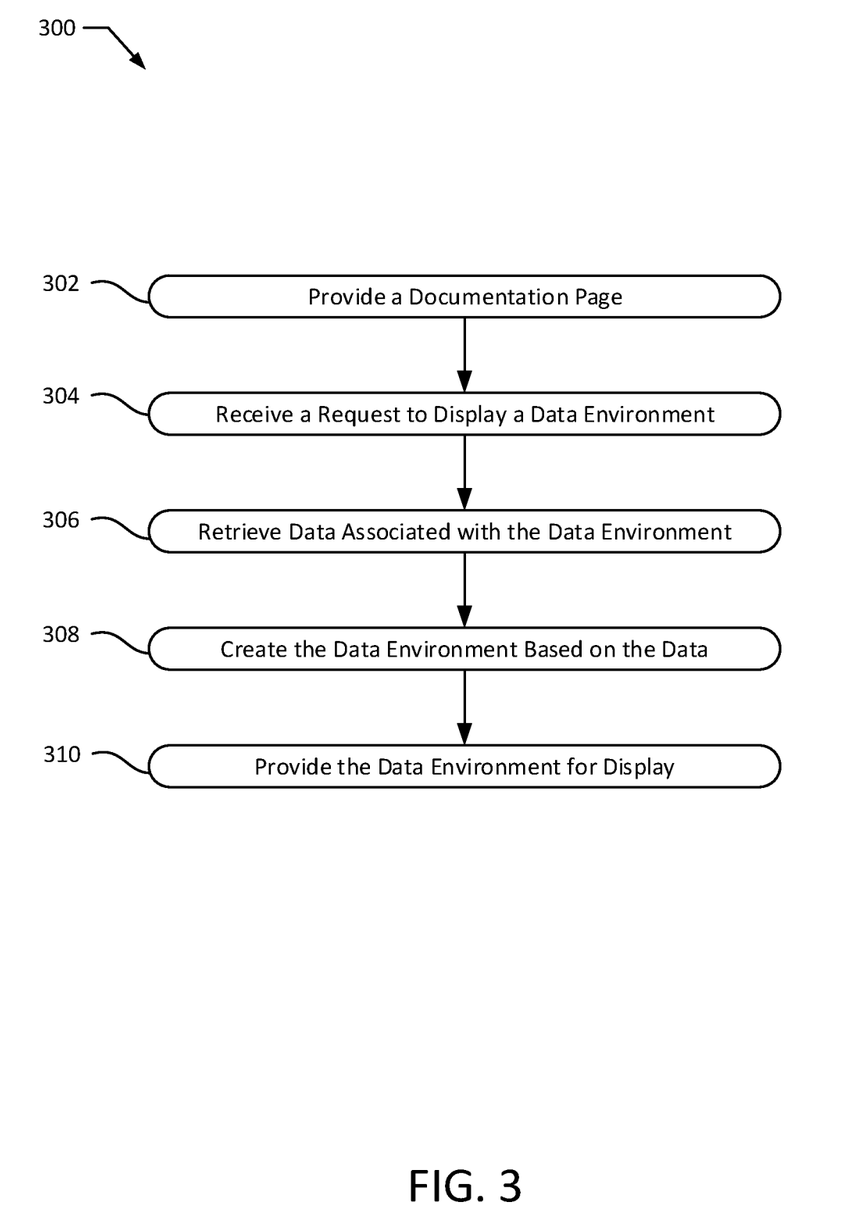
FIG. 3 illustrates a method for generating and displaying documentation pages according to an exemplary embodiment of the present disclosure.

FIG. 3 illustrates a method 300 for generating and displaying documentation pages according to an exemplary embodiment of the present disclosure. In particular, the method 300 may be performed to generate and display documentation pages that include data environments. The method 300 may be implemented on a computer system, such as the system 100. For example, the method 300 may be implemented by one or more of the server 102, the customer database 104, and the computing device 106. The method 300 may also be implemented by a set of instructions stored on a computer-readable medium that, when executed by a processor, cause the computer system to perform the method 300. For example, all or part of the method 300 may be implemented by the processors 134, 138, 142 and/or the memories 136, 140, 143. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 300 may begin with providing a documentation page (block 302). For example, the server 102 may provide a documentation page 108B to a computing device 106. In particular, the server 102 may provide the documentation page 108B for display on the computing device 106 in response to receiving a user request 110. For example, the server 102 may identify a documentation page 108B that corresponds to the same feature 152B as a feature 152A identified in the user request 110. The documentation page 108B may be provided to the computing device 106 over a network 146. In one such example, the server 102 may provide the documentation pages 200, 220 in response to a request from a user associated with the computing device 106.

A request may then be received to display a data environment (block 304). For example, the server 102 may receive a request to display an environment 114 within the documentation page 108A on the computing device 106. As a specific example, the documentation page 108B may be provided to the computing device 106 as a series of one or more instructions 112A (e.g., HTML, instructions). Executing the instructions 112A may cause the computing device 106 to transmit a request to display the environment 114 to the server 102. As a specific example, the environment 114 may execute within an iframe of an HTML page for the documentation page 108A on the computing device 106. Executing instructions to display the iframe may cause the computing device 106 request the environment 114 from the server 102 for display. Continuing the previous example, the computing device 106 may request to display the data environment 212 included within the documentation page 200.

Data associated with the data environment may be retrieved (block 306). For example, the server 102 may retrieve data 120 associated with the data environment 114. In particular, the documentation page 108B may have one or more associated forms 118 identifying particular types of data 120 for use within the environment 114. Server 102 may retrieve the required types of data from a customer database 104 associated with a user requesting the documentation page 108B (e.g., associated with the computing device 106). As explained above, in additional or alternative implementations, the computing device 106 may retrieve the data 120 from the customer database 104 (e.g., based on forms 118 received from the server 102 and/or included with the instructions 112A received from the server 102). Where the computing device 106 is requesting to display the data environment 212, the retrieved data may include the names, surnames, and departments of employees associated with the user requesting the documentation page 200, 220. For example, the retrieved data may include data regarding employees to which the user has access permission within the customer database 104.

The data environment may be created based on the data (block 308). For example, the server 102 and/or the computing device 106 may create to the 114 based on the data 120 received from the customer database 104. In certain implementations, the environment 114 may be created according to forms 118 (e.g., stored within and/or received from the server 102). In particular, the forms 118 may specify particular rows, columns, and/or fields to display within the environment 114 and/or types of data to display (e.g., textual data, numeric data). For example, where the data environment 212 is created, the forms 118 may specify that fields should be displayed for textual information reflecting the name, surname, and department of the employees. The forms 118 may further specify that the field 216 associated with the names of the employees should be interactive (e.g., selectable) for the user. In additional or alternative implementations, the forms 118 may specify that the surname field should be interactive. In implementations where the customer database 104 is accessible via cloud-based tools, the data environment may be created as one of the cloud-based tools. In particular, the data environment may be created as a redirected and resolved URL for a form 118 that queries the customer database 104.

The data environment may be provided for display (block 310). For example, the server 102 may provide the environment 114 to the customer device 106 for display. Additionally or alternatively, where the customer device 106 creates the environment 114, the environment 114 may be provided to the computing device 106 via the documentation page 108A for display. The environment 114 may accordingly be displayed within the documentation page 108A. In particular, where the documentation page 108A is accessed via a web browser, the environment 114 may be displayed within the web browser. Where the environment 114 is contained within an iframe of the documentation page 108A, the iframe itself may be resized based on a size of the environment 114 within the web browser. Displaying the environment 114 within an iframe, embed tag, or other interactive field of the documentation page 108A may allow the user to interact with the environment 114, enabling interactions similar to those discussed above in connection with the documentation pages 230, 240.

In certain implementations, the documentation page 108A may include identifiers of related documentation pages which may be relevant to a user. The related documentation pages displayed may be identified based on the feature 152A associated with the currently-displayed documentation page 108A. Additionally or alternatively, the documentation page 108A may identify related documentation pages based on information associated with the user requesting the documentation page 108A. For example, where the user is logged in to request the documentation page 108A and generate the environment 114 using data associated with the user within the customer database 104, the server 102 and/or the computing device 106 may be able to determine further information regarding the user, allowing for greater customization in identifying related documentation pages for display. As a specific example, the related documentation pages may be selected based on other documentation pages that the user has viewed previously (e.g., related documentation pages may be selected to exclude or assign a lower priority to documentation pages that the user has already viewed). Additionally or alternatively, the related documentation pages may be selected and/or adjusted based on the types of data that the user has access to and/or the number or type of support tickets that the user has requested previously (e.g., for features related to the feature that corresponds to the depicted documentation page). In further implementations, the user data may include identifiers of the type of work the user performs (e.g., the company at which the user works, the industry in which the user works) and the related documentation pages displayed may be selected based at least in part on this information. Other datatypes may include product features to which the user has access, data or tables created by the user, and/or level of experience working with the customer database 104.

Generating and displaying documentation pages using the method 300 may enable the computing device 106 to provide both guidance information on particular features and data environments representing interactive examples of the features themselves. Additionally, because the data environments are generated to include data associated with users requesting the documentation pages, the interactive examples are personalized for the requesting users, allowing them to see exactly how the features themselves interact with their associated customer databases. Furthermore, linking the displayed data environments to particular users and/or customer databases allow for improved updating of the customer databases and related systems. In particular, the environment 114 may be displayed with an option to add the environment to the associated customer database and/or a system (e.g., a dashboard view) associated with the user. When a user selects the option, the computing device 106 may transmit a request to the server and/or the customer database to link the environment (e.g., a data view depicted by the environment) to the customer database and/or to a dashboard associated with the user requested documentation page.

Figure 4:
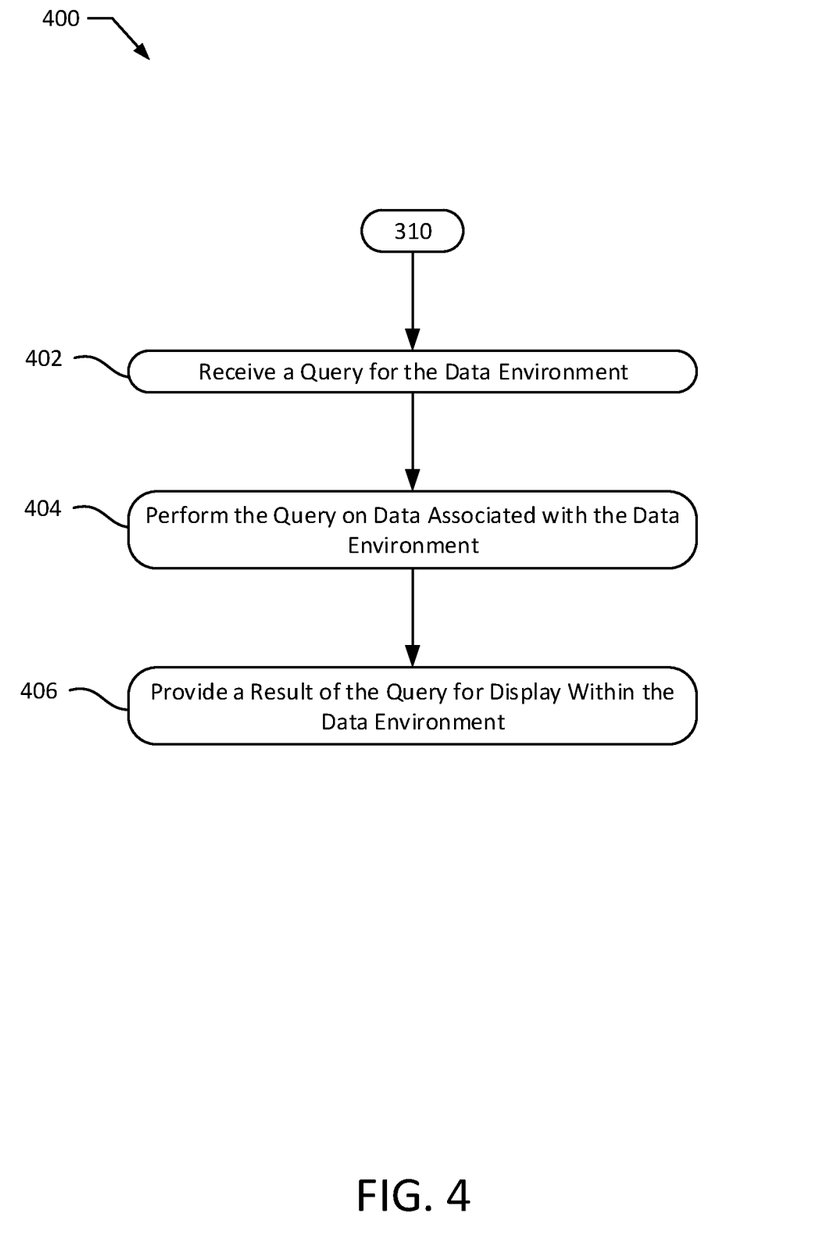
FIG. 4 illustrates a method of updating an interactive form of a documentation page according to an exemplary embodiment of the present disclosure.

FIG. 4 illustrates a method 400 of updating an interactive form of a documentation page according to an exemplary embodiment of the present disclosure. In particular, the method 400 may be performed to update an interactive form within the environment 114 (e.g., after providing the environment 114 for display at block 310). The method 400 may be implemented on a computer system, such as the system 100. For example, the method 400 may be implemented by one or more of the server 102, the customer database 104, and the computing device 106. The method 400 may also be implemented by a set of instructions stored on a computer-readable medium that, when executed by a processor, cause the computer system to perform the method 400. For example, all or part of the method 300 may be implemented by the processors 134, 138, 142 and/or the memories 136, 140, 143. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving a query for the data environment (block 402). For example, the computing device 106 and/or the server 102 may receive a query for the environment 114. The query may be received from a field within the environment. For example, in the data environment 212, the query may be received from the user making a selection in an interactive field 216. As depicted, the interactive field 216 is a drop-down, selectable field, but queries may be received from other types of fields. For example, the query may be received from a text entry field (e.g., where a user types text into the field), a selection box (e.g., a checkbox), a slider field, or any other type of field with which a user may enter information and/or queries. The query may be received to identify or display a particular type of data (e.g., as in the interactive field 216), to add data to the customer database 104, to remove data from the customer database 104, to perform calculations or analysis based on particular data within the customer database 104, and the like. In certain instances, the query may be generated based on the user's interaction with the field of the data environment. For example, the query may be generated in a query language, such as structured query language (SQL), and the like. In certain instances, the computing device 106 may receive and process the query. In additional or alternative implementations, the query may be provided to the server 102 for further processing.

The query may be performed on data associated with the data environment (block 404). For example, the computing device 106 and/or the server 102 may perform the query on the data 120 associated with the environment 114. Certain implementations, the query may be performed on the data 120 locally within the computing device 106. For example, when creating the environment 114, the computing device 106 may receive a copy of the data 120 and may perform the query on the local copy of the data 120 within the computing device 106. As a specific example, for the data environment 212, the computing device 106 may receive and store a copy of the names, surnames, and department of the employees and may perform the query (e.g., searching for information related to "Bob") on the local copy of the data. In additional or alternative implementations, a copy of the data 120 may not be stored or completely stored on the computing device 106. Accordingly, the query may be performed indirectly (e.g., via the server 102 and/or the customer database 104). For example, the computing device 106 may provide the query to the server 102 and/or the customer database 104, which may then perform the query on the associated data. Such implementations may reduce network utilization and the amount of data that has to be copied between the customer database 104, the server 102, and the computing device 106. Additionally, implementations where the data within the customer database 104 may change over time (e.g., as employees are added and removed from the database), providing the query to the customer database 104 (e.g., directly from the computing device 106 and/or indirectly via the server 102) may ensure that the results of the query always remain up to date with the latest data stored in the customer database 104.

A result of the query may be provided for display within the data environment (block 406). For example, a result of the query may be provided to the computing device 106 for display within the environment 114. In particular, the environment 114 may receive the result of the query (e.g., from the customer database 104 and/or from the computing device 106). The environment 114 may display the result by updating one or more fields within the environment. For example, in the documentation page 230, the surname and department fields of the data environment 212 are empty. Upon receiving the results of the query (e.g., that the surname associated with "Bob" is "Maggio" and that the associated department is "Finance"), the related fields of the data environment 212 can be updated to display the received results, as depicted in fields 242, 244 of the documentation page 240. In certain implementations, performing the query may also update or otherwise alter the data stored within the customer database 104. For example, query may be received from a data environment to add, remove, or change data stored within one or more tables 122, 124, 126 of the customer database 104. Upon processing the query, the data environment may display an indication that the data was successfully added, removed, and/or updated.

Performing the method 400 enables the data environments displayed with the documentation pages to provide interactivity with the actual data associated with the customer. By interfacing with real customer data, the method 400 enables the documentation page and the data environments to accurately present how the features associated with the documentation pages may be used alongside the user's existing data.

Figure 5:
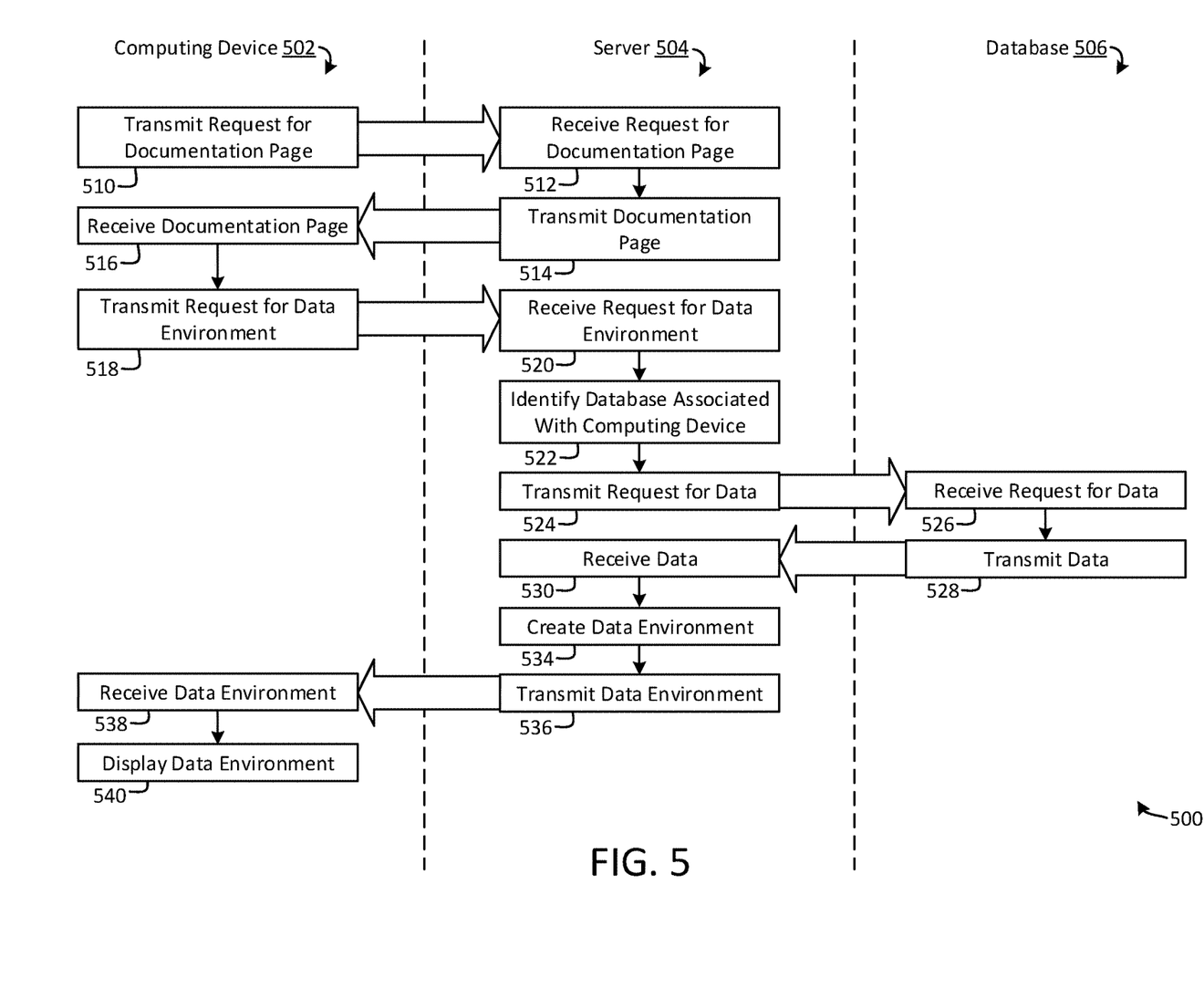
FIG. 5 illustrates a flow chart of a method for generating and displaying documentation pages according to an exemplary embodiment of the present disclosure.

FIG. 5 illustrates a flow chart of a method 500 for generating and displaying documentation pages according to an exemplary embodiment of the present disclosure. The method 500 may be implemented on a computer system, such as the system 100. For example, the flowchart includes a computing device 502, which may be an exemplary implementation of the computing device 106, a server 504, which may be an exemplary implementation of the server 102, and a database 506, which may be an exemplary implementation of the customer database 104. The method 500 may also be implemented by a set of instructions stored on a computer-readable medium that, when executed by a processor, cause the computer system to perform the method. For example, all or part of the method 500 may be implemented by the processors 134, 138, 142 and/or the memories 136, 140, 143. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with the computing device 502 transmitting a request for documentation page (block 510). For example, the computing device 502 may transmit a user request 110 identifying a feature 152A for which documentation pages are requested. The server 504 may receive the request (block 512) and transmit the documentation page (block 514). For example, the server 504 may identify a documentation page associated with the feature identified within the user request received from the computing device 502 and may transmit the documentation page to the computing device 502. The computer is 502 may receive the documentation page (block 516). The documentation page may be received as a series of instructions (e.g., HTML instructions). Upon receiving the documentation page, the computing device 502 may begin displaying the documentation page.

The computing device 502 may transmittal request for a data environment (block 518). For example, while processing the instructions to display the documentation page, the computing device 502 may encounter instructions to display a data environment. For example, instructions may include an iframe or embed tag within the HTML instructions containing a link to a data environment for display within the documentation page. Upon encountering the data environment within the instructions, the computing device 502 may transmit the request for the data environment for proper display within the documentation page. For example, the computing device 502 may query the location of the data environment, which may be transmitted to the server 504. The server 504 may receive the request for the data environment (block 520) and may identify a database 506 associated with the computing device (block 522). For example, the computing device 502 may be associated with a particular user identifier. As a specific example, the request received by the server 504 from the computing device 502 may contain a user ID. Additionally or alternatively, a user of the computing device 502 may be logged into a user account in order to access and/or transmit the request for the documentation page as discussed above, the server 504 may identify the database 506 based on the user ID and/or user account associated with the computing device 502.

The server 504 may transmit a request for data (block 524). The request for data may be generated based on the data environment for which the computing device 502 transmitted the request to block 518. For example, different data environments may include one or more forms and/or fields associated with particular types and/or sources of data. In particular, the forms may store particular views within the database 506 which may identify particular tables, and trees, and/or other displays of the data within the database 506. Database 506 may receive the request for data (block 526) and transmit the data to the server 504 (block 528). In particular, the database 506 may identify the data necessary for display based on the request for data (e.g., the forms and/or views associated with the data environment).

The server 504 may receive the data (block 530) and may create the data environment (block 534). As discussed above, the server 504 may create the data environment by combining the data received from the database 506 with forms associated with the data environment and/or documentation page for display on the computing device 502. The server 504 may then transmit the data environment (block 536) and the computing device 502 may receive the data environment (block 538). The computing device 502 may then display the data environment (block 540). For example, the computing device 502 may combine the data environment with other visual portions of the documentation page (e.g., by inserting the data environment within an iframe of a webpage generated to display the documentation page). A user of the computing device 502 may then be able to interact with the data environment to manipulate data and/or to try features associated with the documentation page.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method comprising:
providing, to a computing device, a documentation page for a feature of a software product, wherein the documentation page is associated with a data environment that provides an interactive dynamic implementation of the feature;
receiving, from the computing device, a request to display the data environment;
after the receiving, retrieving, from a database associated with a user of the computing device, user data identified by the data environment, wherein the data environment is distinct from the user data; and
creating the data environment based on the user data.

2. The method of claim 1, further comprising:
providing the data environment to the computing device for display.

3. The method of claim 1, wherein the interactive dynamic implementation of the feature is customized according to user data.

4. The method of claim 3, wherein the documentation page is identified by the data environment.

5. The method of claim 4, wherein the user data is identified by the data environment based at least in part on an identifier comprised by the documents page.

6. The method of claim 3, wherein the user data is identified by the data environment.

7. The method of claim 1, further comprising:
receiving a query for the data environment, wherein the query is associated with changing at least a portion of the data environment.

8. The method of claim 7, wherein the method further comprises:
performing the query on the user data, wherein the changed at least the portion of the data environment comprises at least a portion of the user data.

9. The method of claim 8, wherein the method further comprises:
   providing a result of the query to the computing device for display within the data environment, and wherein the changed at least the portion of the user data is displayed within the data environment.

10. The method of claim 1, wherein creating the environment further comprises combining the user data with a form associated with the data environment.

11. A method comprising
   receiving, by a computing device, a documentation page for a feature of a software product, wherein the documentation page is associated with a data environment that provides an interactive dynamic implementation of the feature, wherein the interactive dynamic implementation of the feature is customized according to user data identified by the data environment, and wherein the data environment is distinct from the user data;
   generating and sending, by the computing device, a request to display the data environment;
   after the generating and sending, receiving, by the computing device, the data environment, wherein the data environment is created based at least in part on the user data associated with a user of the computing device; and
   displaying, by the computing device, the data environment.

12. The method of claim 11,
   sending, by the computing device, a query for the data environment to the database; and
   receiving, by the computing device, and based at least in part on the sending, a result of the query for display within the data environment.

13. The method of claim 12, wherein the query is associated with changing at least a portion of the user data displayed within the data environment.

14. The method of claim 11, further comprising:
   sending, by the computing device, a request to add the data environment to a computing environment associated with the user.

15. The method of claim 11, wherein the documentation page is a Hypertext Markup Language (HTML) page displaying information regarding a type of environment.

16. The method of claim 15, wherein the data environment is an implementation of the type of environment for which the documentation page provides information.

17. The method of claim 15, wherein the data environment is displayed in an iframe of the HTML page.

18. The method of claim 11, further comprising:
   sending, by the computing device, a request for a documentation page, the request for the documentation page including a user ID.

19. A method comprising:
   receiving, by a computing device, a documentation page for a feature of a software product, wherein the documentation page is associated with a data environment that provides an interactive dynamic implementation of the feature;
   generating and sending, by the computing device, a request to display the data environment;
   after the generating and sending, receiving, by the computing device, the data environment, wherein the data environment is created based at least in part on user data associated with a user of the computing device, wherein the data environment is distinct from the user data; and
   displaying, by the computing device, the data environment.

20. The method of claim 19, further comprising:
   displaying, by the computing device, the data environment.

* * * * *